United States Patent
Pongratz et al.

(10) Patent No.: US 9,303,588 B2
(45) Date of Patent: Apr. 5, 2016

(54) SOUND ABSORBER, SOUND ABSORBER ASSEMBLY AND AN ENGINE WITH A SOUND ABSORBER ASSEMBLY

(71) Applicants: Airbus Defence and Space GmbH, Ottobrunn (DE); Rolls-Royce Deutschland Ltd & Co KG, Blankenfelde-Mahlow (DE)

(72) Inventors: Reinhard Pongratz, Taufkirchen (DE); Christoph Richter, Berlin (DE); Max Kern, Nürtingen (DE); Daniel Redmann, München (DE)

(73) Assignees: Airbus Defence and Space GmbH, Ottobrunn (DE); Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 0 days.

(21) Appl. No.: 14/471,561

(22) Filed: Aug. 28, 2014

(65) Prior Publication Data

US 2015/0060194 A1    Mar. 5, 2015

(30) Foreign Application Priority Data

Aug. 30, 2013   (DE) .......................... 10 2013 109 492

(51) Int. Cl.
*E04B 1/82*   (2006.01)
*F02K 1/82*   (2006.01)
(Continued)

(52) U.S. Cl.
CPC ................. *F02K 1/827* (2013.01); *F02C 7/045* (2013.01); *F02C 7/24* (2013.01); *F02K 1/44* (2013.01); *G10K 11/172* (2013.01); *F05D 2250/283* (2013.01); *F05D 2260/96* (2013.01)

(58) Field of Classification Search
CPC .............................. G10K 11/172; E04B 1/82
USPC .......................... 181/286, 292, 211, 213, 214
See application file for complete search history.

(56) References Cited

U.S. PATENT DOCUMENTS 3,479,779 A   11/1969   Ziegler
3,831,710 A   8/1974   Wirt
(Continued)

FOREIGN PATENT DOCUMENTS

DE          25 06 472 A1   8/1976
DE   10 2011 008 920 A1   7/2012
(Continued)

OTHER PUBLICATIONS

The extended European search report for the corresponding European patent application No. 14179329.9, issued on Feb. 11, 2015.
(Continued)

*Primary Examiner* — Forrest M Phillips
(74) *Attorney, Agent, or Firm* — Global IP Counselors, LLP

(57) ABSTRACT

A sound absorber comprising a base body and a tongue (24). The base body has a bottom plate, a wall enclosing the bottom plate and an opening enabling the entry of air into the base body. The tongue has a fixed end, a free end and a central portion disposed between the fixed and the free end. The free end of the tongue is spaced from the wall and the bottom plate, and the central portion of the tongue is disposed to extend at least partially straight along a width direction. Furthermore, a sound absorber assembly can include at least two sound absorbers, and an engine, in particular, for an aircraft, comprising such a sound absorber and/or such a sound absorber assembly.

20 Claims, 8 Drawing Sheets

(51) Int. Cl.
  *F02K 1/44* (2006.01)
  *F02C 7/045* (2006.01)
  *F02C 7/24* (2006.01)
  *G10K 11/172* (2006.01)

(56) References Cited

U.S. PATENT DOCUMENTS

| | | | |
|---|---|---|---|
| 3,887,031 A | 6/1975 | Wirt | |
| 4,373,608 A * | 2/1983 | Holmes | 181/202 |
| 5,760,349 A | 6/1998 | Borchers et al. | |
| 6,122,892 A | 9/2000 | Gonidec et al. | |
| 6,609,592 B2 * | 8/2003 | Wilson | 181/292 |
| 7,401,682 B2 | 7/2008 | Proscia et al. | |
| 8,047,329 B1 * | 11/2011 | Douglas et al. | 181/292 |
| 2013/0186707 A1 * | 7/2013 | Richter | 181/292 |
| 2013/0306401 A1 * | 11/2013 | Todorovic | 181/256 |
| 2015/0068834 A1 * | 3/2015 | Barrett et al. | 181/213 |

FOREIGN PATENT DOCUMENTS

| | | |
|---|---|---|
| EP | 2 605 238 A2 | 6/2013 |
| GB | 1 470 036 A | 4/1977 |
| WO | 2005/100753 A1 | 10/2005 |

OTHER PUBLICATIONS

The German Office Action for the corresponding German patent application No. 10 2013 109 492.9, issued on Apr. 16, 2014.

* cited by examiner

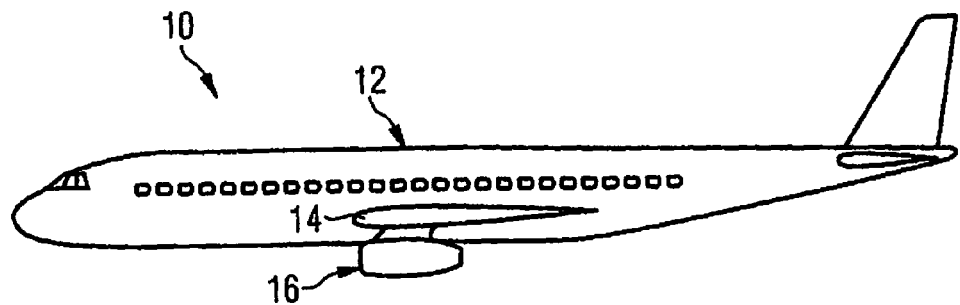
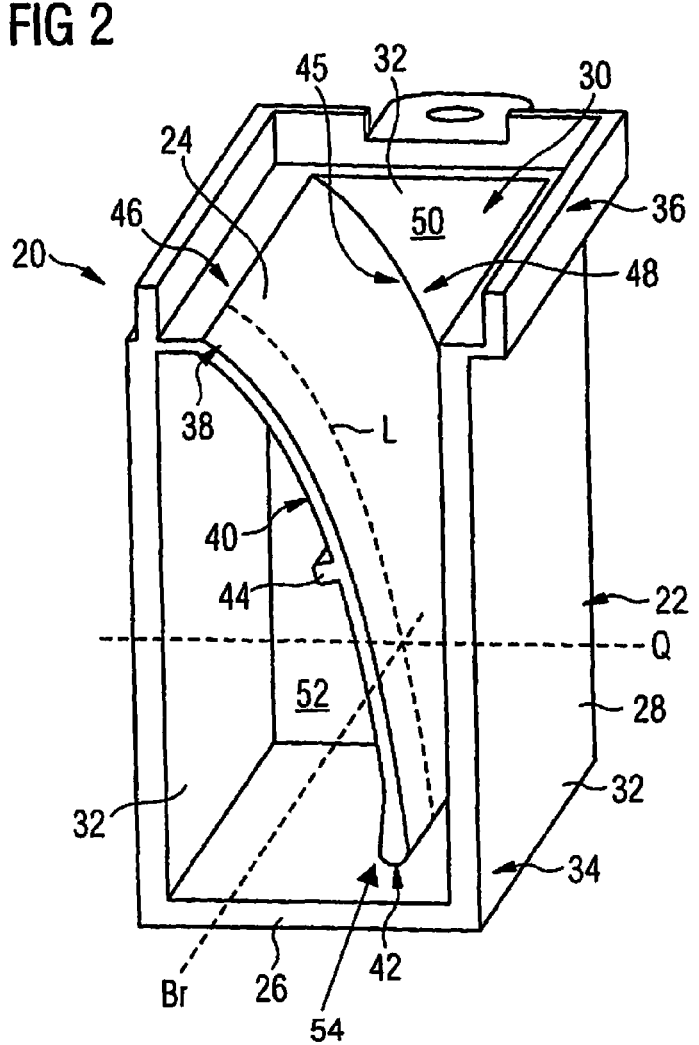

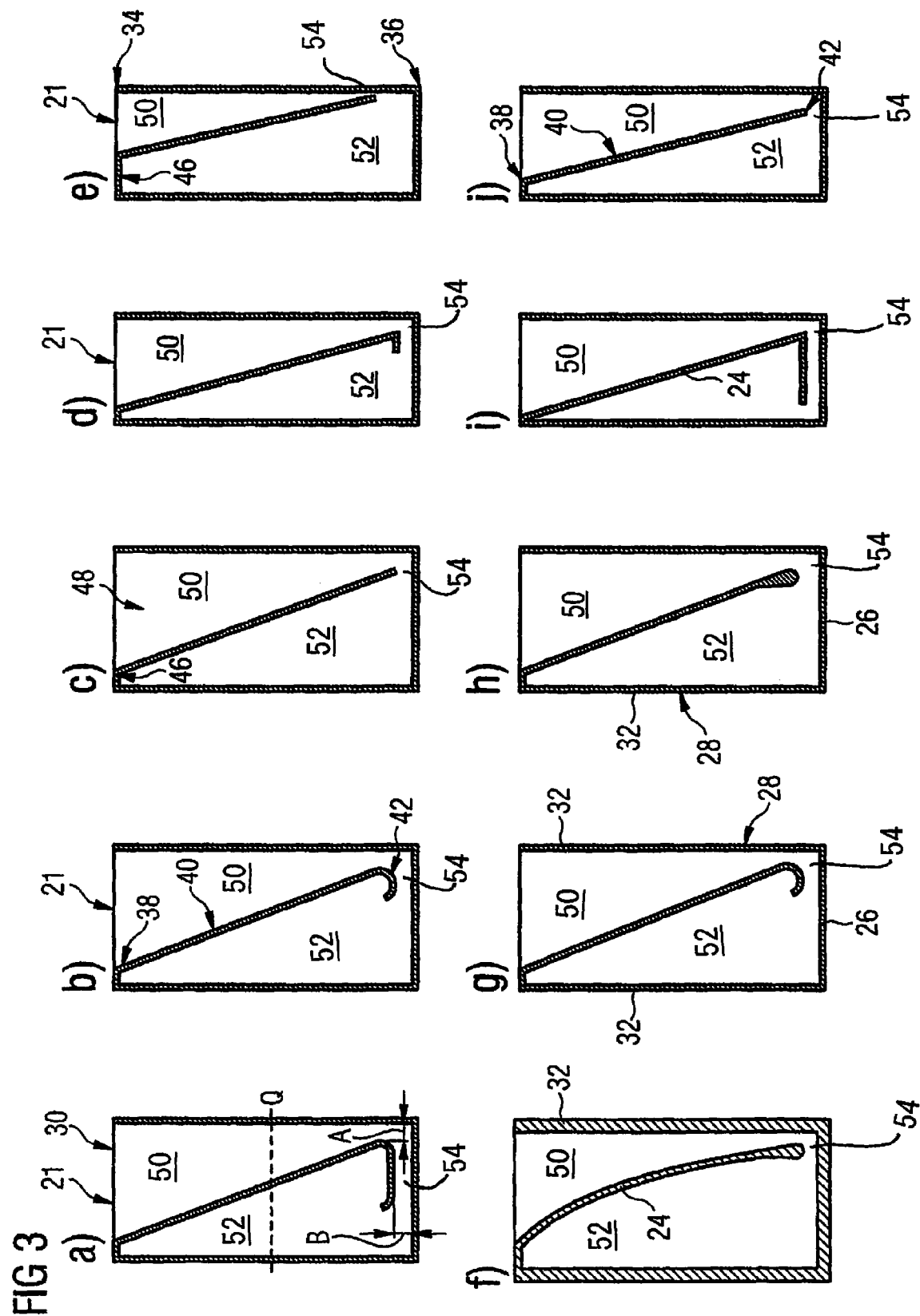

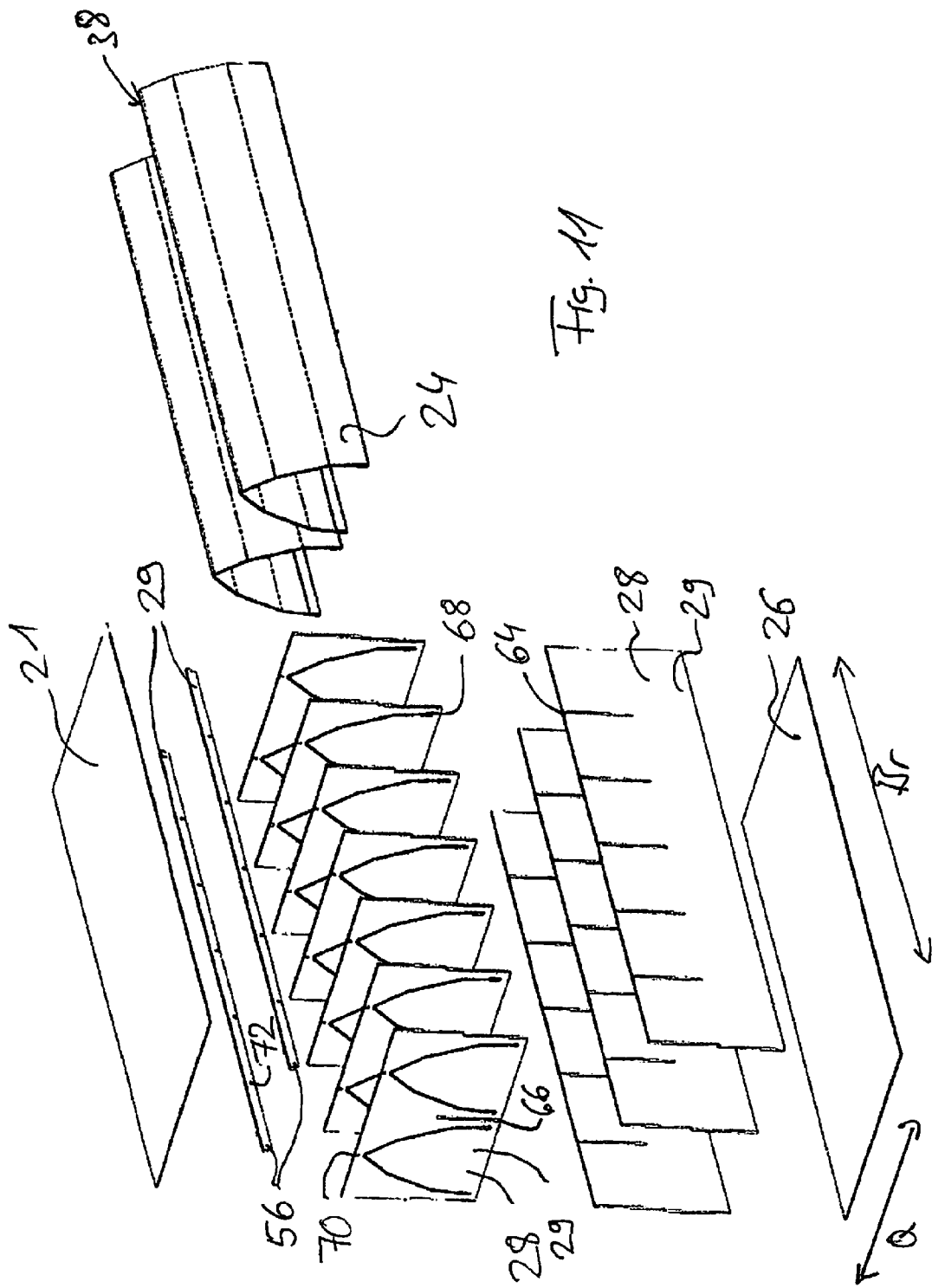

SOUND ABSORBER, SOUND ABSORBER ASSEMBLY AND AN ENGINE WITH A SOUND ABSORBER ASSEMBLY

CROSS-REFERENCE TO RELATED APPLICATION

This application claims priority under 35 U.S.C. §119(a) to German Patent Application No. 10 2013 109 492.9, filed on Aug. 30, 2013, the entire contents of German Patent Application No. 10 2013 109 492.9 are hereby incorporated herein by reference.

BACKGROUND

1. Field of the Invention

The invention relates to a sound absorber, in particular for an engine of an aircraft, comprising a base body and a tongue connected to the base body. Furthermore, the invention relates to a sound absorber assembly comprising at least two of the aforementioned sound absorbers. In addition, the invention is directed to an engine, in particular for an aircraft, comprising such a sound absorber and/or such a sound absorber assembly.

2. Background Information

Sound absorbers are provided for absorbing noises that occur, and are used, inter alia, in engines of aircraft in order to minimize disruptive noises produced by the engine. On the one hand, this increases passenger comfort and reduces the noise pollution of the environment. Also, sound sources may produce undesired resonances that can be minimized by means of sound absorbers. In order to provide as-efficient a sound absorption as possible, the sound absorbers are supposed to absorb sound over a broad band.

U.S. Pat. No. 5,760,349A discloses a sound absorber having a cuboid-shaped basic structure into which a funnel-shaped dividing element is installed. U.S. Pat. No. 3,831,710 describes a sound absorption panel. DE 10 2011 008 920 A1 and DE 25 06 472A1 also show sound absorbers with a funnel-shaped dividing element. U.S. Pat. No. 6,122,892A1 and U.S. Pat. No. 7,401,682B2 disclose sound absorbers that use a Helmholtz resonator for sound absorption.

SUMMARY

An object of the invention is to provide an improved sound absorber. The object is achieved by the sound absorber according, the sound absorber assembly and the engine according to the embodiments disclosed herein.

The sound absorber, in particular for an engine of an aircraft, comprises a base body and a tongue connected to the base body. The base body has a bottom plate, a wall enclosing the bottom plate and an opening enabling the entry of air into the base body. The tongue has a fixed end, a free end and a central portion disposed between the fixed end and the free end. The tongue further has a longitudinal direction extending from the fixed end towards the free end, a width direction extending substantially perpendicularly to the longitudinal direction, and a transverse direction extending substantially perpendicularly to the longitudinal direction and perpendicularly to the width direction. The tongue divides the space of the base body into a partial space adjacent to the bottom plate and a partial space adjacent to the opening. The two partial spaces are connected to each other via the gap. The fixed end is connected to the wall. In the transverse direction, the free end is disposed at a first distance from the wall, and in the longitudinal direction at a second distance from the bottom plate. The first and second distances determine the size of the gap. The central portion of the tongue is configured to extend at least partially straight along the width direction.

An aircraft is to be understood to be any vehicle capable of flying. For example, an aircraft can be an airplane or a helicopter. The engine is preferably a device serving for propelling the aircraft. This can be a jet engine and/or a propeller engine. The sound absorber can be disposed on or in the engine. Furthermore, the sound absorber can also be disposed on or in the vicinity of various devices that produce undesired sound. With regard to the aircraft, the sound absorber can also be provided on or in the vicinity of rotating devices or outlets for air, for example an exhaust outlet.

The wall preferably contacts the bottom plate and protrudes from the bottom plate so that the bottom plate and the wall enclose a half-space. The half-space is preferably in connection with the environment via the opening, so that air from the environment can move through the opening into the half-space of the base body or vice versa. The opening can be configured as one or more holes and is preferably disposed opposite the bottom plate.

The wall has, in particular, a first edge portion in contact with the bottom plate and a second edge portion enclosing the opening. Accordingly, the opening is spaced from the bottom plate by the wall. The wall can have several side walls that are preferably disposed at the respective sides of the bottom plate.

With the fixed end, the tongue is connected to the wall, in particular to a side wall of the wall. This connection can be established via an attachment portion. The tongue defines a longitudinal direction extending from the fixed end to the free end. In the transverse direction, the free end is spaced at a first distance from the wall, in particular to a side wall closest to the free end. In the longitudinal direction, the free end furthermore extends at a second distance from the bottom plate. This preferably means that the free end forms a gap between itself and the base body in the longitudinal direction and in the transverse direction.

The tongue divides the space of the base body into a partial space adjacent to the bottom plate and a partial space adjacent to the opening. The two partial spaces are connected to each other via the gap, so that air is able to flow from the environment via the opening into the partial space adjacent to the opening. Moreover, the air can flow via the gap into the partial space adjacent to the bottom plate.

The central portion of the tongue is disposed to extend at least partially straight along the width direction. Preferably, the tongue is disposed to be straight over the entire width direction. Straight in this context is supposed to mean not bent or planar. Therefore, the tongue is preferably bent only along the longitudinal direction, and not along the width direction. The production of the tongue can thus be simplified because the tongue has to be bent only in one direction.

The action of the sound absorber preferably follows the mode of action of a Helmholtz resonator and/or of the λ/4 resonator. By selecting the shape and size of the tongue, the volumes of the two partial spaces can be selected to be different. In accordance with the volumes of the partial spaces, natural frequencies of the air masses vibrating therein result. In addition, the extent of the gap, which together with the volumes of the two partial spaces determines the natural frequency and thus the absorption frequencies of the Helmholtz absorber, can be determined through the shape and the length of the tongue. This means that the absorption frequencies of the sound absorber can be adapted to the sound to be absorbed through the shape and length of the tongue. Due to the straight configuration of the tongue in the width direction, this adapting step is particularly simple to carry out because a bending or forming step in this direction is no longer necessary.

Furthermore, a covering layer which is air-permeable can be provided in the region of the opening. Together with the tongue, the covering layer serves as a λ/4 absorber. Therefore, it is possible to set the sound frequencies absorbed by the λ/4 absorber by means of the selection of the shape and length of the tongue.

It is preferred that the bottom plate is trapezoidal, in particular rectangular. A trapezoidal, in particular rectangular or square, configuration of the bottom plate makes it possible for several sound absorbers to be disposed adjacent to each other in such a way that they completely cover a surface. This means that the use of several sound absorbers does not result in any interstices between the individual sound absorbers due to the shape of the sound absorber. These interstices would in that case make no contribution to the absorption of sound, so that the degree of efficiency of the sound absorbers would be reduced. The surface on which the sound absorbers are disposed can thus be used optimally for absorbing sound. In this respect, a triangular or hexagonal shape is also suitable for the configuration of the bottom plate, because a surface can also be completely covered with three or six corners.

It is preferred that the tongue is bent along the longitudinal direction, in particular in the shape of a parabola branch, an exponential function or a hyperbola. The bend or curvature of the tongue along the longitudinal direction makes it possible to adapt the partial spaces in such a manner that they have the desired natural frequencies with respect to the sound frequencies to be absorbed. Moreover, the distances to the covering layer can be varied by means of the curvature in the longitudinal direction of the tongue in such a way that the absorptions of the λ/4 absorber absorb over a broad band. The bend of the tongue further makes it possible that low-frequency noises are absorbed by the sound absorber. The shapes of a parabola branch, of an exponential function or of a hyperbola have been found to be suitable bends. This means that the tongue follows a parabola branch, an exponential function or a hyperbola in the cross section perpendicular to the width direction.

It is preferred that the free end is curved in the longitudinal direction. In particular, the free end is curved so as to point away from the region of the wall closest to the free end in the transverse direction. For example, this means that the free end is curved so as to point away from the side wall of the wall closest to the free end, i.e. spaced at the first distance. Preferably the region of the free end that is curved is disposed at least in some areas substantially parallel to the transverse direction and/or the bottom plate.

The shape of the curvature can be round, angular or acute-angled. Depending on the configuration of the curvature, also with respect to the first and second distance, the resonance behavior of the Helmholtz absorber can be changed. The first and second distances determine the size of the gap that is significant for the absorption behavior of the Helmholtz resonator. Depending on the size of the gap, an absorption behavior at different frequencies results. This means that the absorption behavior of the sound absorber can be adapted to the noises occurring by a corresponding selection of the first and second distances. The radius of the curvature of the free end also influences the absorption behavior of the Helmholtz absorber.

Because the tongue, if at all, is bent only in the longitudinal direction but not in the width direction, the first and second distances can be adjusted particularly simply by varying the length of the tongue in the longitudinal direction and bending the tongue in the longitudinal direction. It was found that a round, bulbous shaping of the free end results in a lower-frequency but also more narrow-band absorption. A sharp-edged shape of the bend of the free end leads to a high flow-through resistance at high levels, that means a rather high-frequency and broader-band absorption.

Depending on the frequency of the noises to be absorbed, the bend of the free end can be selected or varied between a bulbous and an acute shape in combination with the volume of the two half-spaces in such a way that the absorption can be adapted to the occurring noise. Furthermore, it is possible, in addition or as an alternative to the bend of the free end, to thicken the free end, for example in a drop shape. This can contribute to varying the first and second distances.

It is preferred that the tongue has a bend in the longitudinal direction and in the transverse direction. The bend in the longitudinal direction is preferably provided by the central portion, whereas the bend in the transverse direction is provided by the free end. This results, in particular, in the above-described configuration of the tongue.

It is preferred that the tongue is made from metal, in particular sheet metal, carbon fibers and/or ceramic composite materials. These materials have been found to be suitable for the configuration of the tongue. Particularly in the case of the use of the sound absorber in an engine, the materials are exposed to great temperature fluctuations that the sound absorber has to withstand. The above-mentioned materials have proven to be suitable for this purpose. In particular the use of sheet metal is particularly suitable for adapting the tongue to the various absorption frequencies, because sheet metal is particularly easy to shape. Furthermore, it was found that the material of the tongue is not a decisive factor for the absorption effect of the sound absorber.

The base body can be made from the same material as the tongue or a different material. In particular if the tongue is made from sheet metal, the base body is made from a material that has a greater bending stiffness than sheet metal. The material of the base body withstands, in particular, high temperatures such as they occur in engines.

It is preferred that at least the central portion has two lateral portions extending in the longitudinal direction, with the lateral portions preferably being tightly connected with the wall and, also preferably, the lateral portions being welded to the wall. The lateral portions preferably extend along the central portion, in particular along the entire tongue, that is, from the fixed end via the central portion to the free end. The lateral portions rest tight against the wall, so that the partial spaces are in connection with each other preferably only via the gap. This means that "tight" in this context means, in particular, air-tight. In a preferred embodiment, this is achieved by welding the tongue at the lateral portions to the wall.

It is preferred that the sound absorber has a covering layer covering the opening, with the covering layer preferably being formed from a perforated metal, particularly from a µ-perforated metal, and/or from a fabric. The covering layer is air-permeable, so that sound is able to enter into the space of the base body from the surroundings and form a λ/4 absorber with the tongue, as this is known to the person skilled in the art. The air-permeability of the covering layer is achieved, for example, by means of a perforation. Metal, in particular, is provided as the material. The hole size of the perforation is preferably smaller than 0.2 mm. The thickness of the covering layer, i.e. the extent of the covering layer perpendicular to the width direction and perpendicular to the transverse direction, is preferably between 0.5 mm and 1.5 mm. Alternatively or additionally, the air-permeability of the covering layer can be provided by a fabric that is porous. In this case, the porosity is preferably between 3% and 15%.

Furthermore, the invention relates to a sound absorber assembly, in particular for an engine of an aircraft, comprising at least two sound absorbers as they were described above. The remarks made with respect to the sound absorbers regarding preferred embodiments and preferred effects also apply to the sound absorber assembly. The bottom plates of the individual sound absorbers of the sound absorber assembly are formed, in particular, by a single, one-piece bottom plate. This advantageously simplifies manufacture.

It is preferred that the at least two sound absorbers are disposed one behind the other in the transverse direction and/or the width direction, wherein the wall preferably includes at least in some regions an angle with the bottom plate unequal to 90° at least in some regions. In the case of an arrangement of the sound absorbers one behind the other in the transverse direction and/or in the width direction, a complete coverage of a surface can be achieved particularly easily. This particularly applies if the bottom plate of the sound absorbers is rectangular. For example, the sound absorbers are disposed in a row one behind the other in the transverse direction or in the width direction.

If the surface to be covered with the sound absorbers of the sound absorber assembly is not plane but curved, for example, it is preferred that the wall includes at least in some regions an angle unequal to 90° relative to the bottom plate. In particular, side walls of the base body disposed perpendicular to a direction of curvature of the surface to be covered with the sound absorbers are to be inclined relative to the bottom plate in such a manner that no interstices form between the individual sound absorbers. In such a configuration, the base bodies can be conical. That means that the side walls of the wall are arranged in such a way, in particular, that the surface area of the opening is smaller or greater than the surface area of the bottom plate.

If, for example, the sound absorbers are disposed on the inside of a pipe, the side walls of the wall disposed perpendicular to the circumferential direction are inclined by an angle <90° relative to the bottom plate, so that the individual sound absorbers can be disposed without interruptions in the circumferential direction. Because of an arrangement without any interruptions, the entire surface can be used for sound absorption. In addition, a surface bent in two directions can be covered by disposing the wall relative to the bottom plate at an angle unequal to 90°.

The inclination of the wall relative to the bottom plate is easy to realize not least because the tongue is straight in the width direction, so that the tongue is easy to install also into a conical base body. If the side walls of the wall connected to the lateral portions of the tongue are also disposed at an angle unequal to 90° relative to the wall, the tongue can be cut by, for example, laser cutting. Cutting and inserting can also be carried out particularly easily because the tongue is straight in the width direction.

It is preferred that the tongue is connected to the wall by means of an attachment portion, with the opening preferably defining a plane and, also preferably, with the attachment portion extending in the plane of the opening over a surface area measuring less than 10%, in particular less than 5%, of the extent of the opening. The tongue can be attached particularly easily to the base body by means of the attachment portion. In this case, the attachment portion can protrude into the opening. Preferably, the surface area that the attachment portion takes up in the plane of the opening is less than 10%, in particular less than 5%, of the surface area of the opening. The attachment portion thus reduces the extent of the opening and thus, the effective surface of the sound absorber. Accordingly, it is particularly preferred to configure the surface area of the attachment portion that the latter takes up in the opening to be as small as possible.

Alternatively, it is preferred that the tongue has no attaching webs. In this case, the tongue or tongues of the sound absorber assembly are preferably directly attached to the wall. It is preferred that at least two tongues, which protrude into at least two base bodies, are disposed on one attachment portion. This offers the advantage that the two tongues of adjacent base bodies are attached to one attachment portion, so that the two tongues can be attached in a single assembly step. This constitutes a particularly simple and rapid type of attachment.

This effect can be increased if more than two tongues are disposed on one attachment portion. This may be realized, for example, by several tongues, which are inserted into base bodies disposed in two rows parallel to the longitudinal extent of the attachment portion, being disposed on two sides of the attachment portion, spaced-apart in one direction.

It is preferred that the regions of walls of two sound absorbers that abut against each other are formed by a common wall. In the case of two sound absorbers, which, as in the preferred embodiment, are disposed adjacent to each other without any interruption, adjacent walls, in particular adjacent side walls of two base bodies, abut against each other. In the preferred embodiment, these regions of the walls, or these side walls, which abut against each other, are replaced with a single wall or side wall, so that space and weight can thus be saved. Preferably, this takes place not only on one side of the base body, but on several, so that this results in a kind of honeycomb providing the wall of the individual base bodies.

It is preferred that the tongues of two sound absorbers are attached to the common wall, with the common wall preferably having a cut-out. The tongues of two adjacent sound absorbers are preferably attached to the common wall at the same height. In particular, the tongues are arranged in such a way that they protrude in opposite directions from the common wall, so that preferably, the result is a mirror-image arrangement of the tongues on the common wall. A region of the covering layer located in the immediate vicinity of the common wall can additionally or alternatively serve for attaching the tongues to the covering layer. The tongues attached to the common wall can be configured as a single piece. For example, the tongues can be attached to the edge of the cut-out.

Preferably, the size of the extent of the cut-out, compared to the two-dimensional extent of the common wall, is between 50% and 100%. This means that the cut-out can be of such a size that a good air connection between the two sound absorbers is possible via the cut-out. Thus, the two second partial spaces located underneath the respective tongues of the respective sound absorbers can form a common partial space. For example, the common wall can be omitted almost completely; that means the size of the extent of the cut-out is close to 100% of the extent of the entire wall, so that material can thus be saved. For example, the common wall can be reduced in the region of the tongues down to a small web. This offers the advantage that a wall can be saved in the sound absorber assembly configured in this way.

In one embodiment, several cut-outs are provided in the common wall. The extent of all cut-outs together can again correspond to between 50% and 100% of the extent of the common wall. It is preferred that the area at which at least one of the tongues is attached to the common wall divides the common wall into a first portion adjacent to the opening and a second portion adjacent to the bottom plate, with the second portion having the cut-out, the cut-out preferably including the entire second portion.

In this preferred embodiment, the tongues are not disposed immediately adjacent to the covering layer, but spaced from it. The area, which preferably has a linear extent and at which the tongue is attached to the common wall, divides the common wall into a first upper portion and a second lower portion. Preferably, the cut-out is disposed in the second portion. In particular, the extent of the cut-out is as large as the extent of the second portion; that means the common wall includes only the region of the first portion. Thus, material in the region of the second portion can be saved in its entirety in this preferred arrangement of the sound absorber assembly. Also preferably, the first portion is formed as a web, particularly in the case in which the tongues are disposed close to the covering layer. Also in this case, the result again is a second partial space extending over two sound absorbers of the sound absorber assembly.

One aspect of the invention relates to a method for producing the preferred sound absorber assembly described above. The method comprises the following steps: joining a bottom plate, at least two first common walls and at least two second common walls of a web corresponding to the first portion, a tongue and a covering plate. The second step comprises welding together the joined parts described above.

Preferably, the first common wall has first cuts and the second common wall second cuts, so that these common walls can be plugged together. Also preferably, the second common walls have third cuts into which the tongues can be pushed. Also preferably, the second common walls have fourth cuts into which the webs can be plugged.

It is preferred that a plurality of sound absorbers is provided which are disposed in the form of a pipe having a radial direction, a circumferential direction and an axial direction, with the opening of the sound absorbers preferably pointing inwards in the radial direction, the attachment portion also preferably being disposed in the circumferential direction or in the axial direction.

The arrangement of the sound absorbers in the form of a pipe is particularly suitable for being disposed in an engine. As was already described above, the wall is preferably inclined relative to the bottom plate, so that the plane surface of the pipe is completely/uninterruptedly covered by the openings of the individual sound absorbers.

Also preferably, the tongues are attached to an attachment portion extending either in the circumferential direction or in the axial direction. An attachment of the tongue can thus be obtained particularly easily. If the attachment portion is disposed in the circumferential direction, drain openings for draining water, in particular condensated water, can be disposed particularly easily in the base body. With regard to the absorption action, no appreciable differences result from the arrangement of the attachment portion either in the circumferential direction or the axial direction.

It is preferred that a drain opening is installed between the base bodies along the attachment portion of the tongue and/or along the bottom plate, particularly in the circumferential direction. Using the drain opening, liquid, such as, for example, condensated water or kerosene, can be discharged from the base body so that accumulations of liquid in the base body, which may possibly affect the functional performance of the sound absorber assembly or of the sound absorber, can be avoided. Particularly in the case of a pipe-shaped sound absorber assembly, the drain opening is disposed in the circumferential direction. The drain opening can comprise one or more holes that each constitute a connection between the half-space of the base body and the environment. In particular, the drain opening can be provided by a hole in a sound absorber.

The invention further relates to an engine, in particular for an aircraft, comprising a sound absorber as described above and/or a sound absorber assembly as described above. The remarks and considerations made above apply also in this case. The sound absorber or the sound absorber assembly is preferably provided in an exhaust cone of the engine, in the engine intake, in the bypass duct, the mixed nozzle and/or in the engine core. In particular low-frequency noises are to be absorbed by means of the sound absorber and the sound absorber assembly.

DESCRIPTION OF THE DRAWINGS

The invention is characterized in more detail below with reference to exemplary embodiments. In the schematic drawings:

FIG. 1 shows a side view of an aircraft;
FIG. 2 shows a cross section through a sound absorber;
FIGS. 3a to 3j show a cross section through sound absorbers with different tongues;
FIG. 11 shows an exploded view of the embodiment of the sound absorber assembly shown in FIG. 8.

DETAILED DESCRIPTION OF EMBODIMENTS

Figure 4:
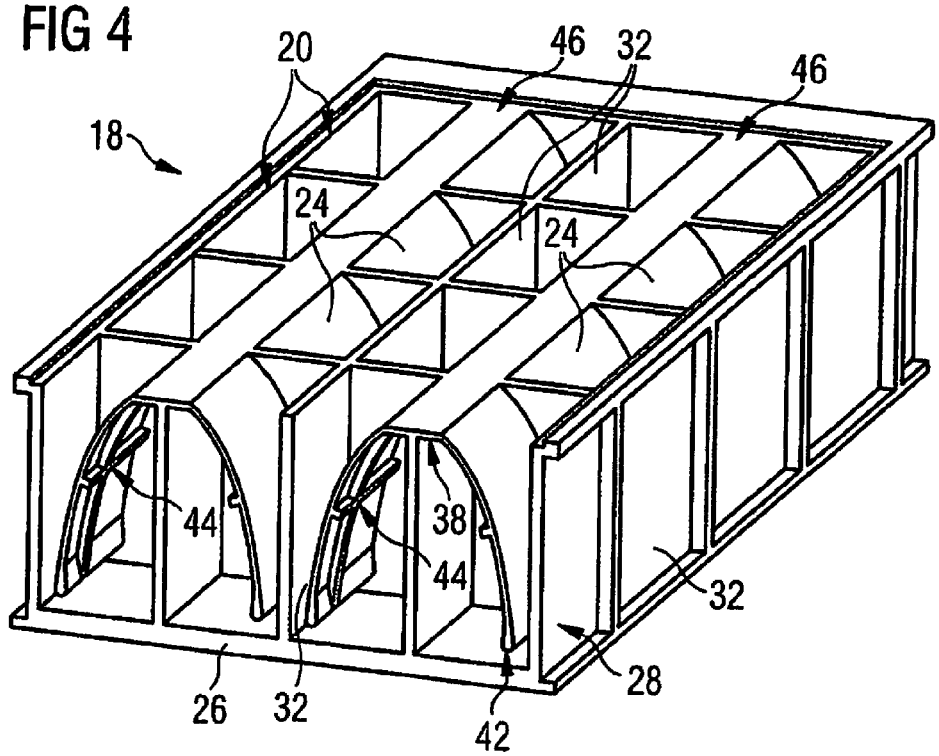
FIG. 4 shows a cross section through a sound absorber assembly.

An aircraft 10 has a fuselage 12 to which a wing 14 is attached. An engine 16 is attached to the wing 14. A sound absorber assembly 18 is disposed in an exhaust cone of the engine 16. Alternatively, the sound absorber assembly 18 can be disposed in an engine intake, a bypass duct, in the mixed nozzle and in the engine core. The sound absorber assembly 18 is provided particularly if a low-frequency absorption of the noise produced in the engine 16 is desired.

The sound absorber assembly 18 is composed of several sound absorbers 20. The sound absorber 20 has a base body 22 and a tongue 24. The base body 22 has a bottom plate 26, a wall 28 and an opening 30. Furthermore, the sound absorber 20 has a covering layer 21 disposed in the region of the opening 30. The covering layer 21 is drawn in only in FIGS. 3a to 3j. The covering layer 21 is made from an air-permeable material and consists, for example, of a perforated metal, a μ-perforated metal and/or a metal fabric.

In the embodiments shown in FIGS. 2 to 7, the bottom plate 26 is rectangular. The wall 28 is composed of four side walls 32 that each contact one side of the bottom plate 26. A first edge portion 34 of the wall encloses the bottom plate 26, while a second edge portion 36 surrounds the opening 30. The opening 30 and the bottom plate 26 are disposed opposite from each other, with the distance of the opening 30 and the bottom plate 26 being determined by the wall 28.

The tongue 24 has a fixed end 38, a central portion 40 and a free end 42. The central portion 40 is disposed between the fixed end 38 and the free end 42. A longitudinal direction L extends from the fixed end 38 to the free end 42. A transverse direction Q and a width direction Br are disposed perpendicular thereto. The tongue 24 is reinforced by struts 44. Along the longitudinal direction L, the tongue 24 has lateral portions 45 that contact side walls 32 of the wall 28 spaced apart in the width direction Br. The lateral portions 45 extend over the entire length of the tongue 24. The lateral portions 45 are connected in an air-tight manner to the contacting side walls 32 by welding.

The tongue 24 is attached to the wall 28 via an attachment portion 46. The free end 42 is spaced in the transverse direction Q from a side wall 32 of the wall 28 by the first distance A. The free end 42 is spaced in the longitudinal direction L from the bottom plate 26 by a second distance B. This can be seen particularly well in FIGS. 3a to 3j.

In FIG. 2, the tongue 24 is bent along the longitudinal direction L in the shape of a parabola branch, whereas it is straight in the width direction Br. The tongue 24 is made from sheet metal.

The base body 22 delimits a half-space 48, which is connected to the surroundings of the sound absorber 20 via the opening 30. The half-space 48 is divided by the tongue 24 into a first partial space 50 adjacent to the opening 30 and a second partial space 52 adjacent to the bottom plate 26. The partial spaces 50 and 52 are connected to each other via a gap 54. The gap 54 is formed by the free end 42 and the base body 22; that means that the extent of the gap 54 is determined by the first distance A and the second distance B.

The size of the gap 54, i.e. also the first distance A and the second distance B, is determined by the shape and the length of the tongue 24. In particular the shape of the free end 42 is a decisive factor for the extent of the gap 54. As shown in FIGS. 3a, b, d, g and i, the free end 42 can be bent away from the side wall 32 that is closest to the free end 42 in the transverse direction Q, i.e. spaced from it by the first distance A, in the transverse direction Q from this side wall 32. In this case, the curvature can be arcuate or acute-angled. Alternatively, the free end 42 may not have a curvature (see FIGS. 3c, 3e and 3j) or be thickened at the end thereof, as this is shown in FIGS. 3f and 3h.

Figure 5:
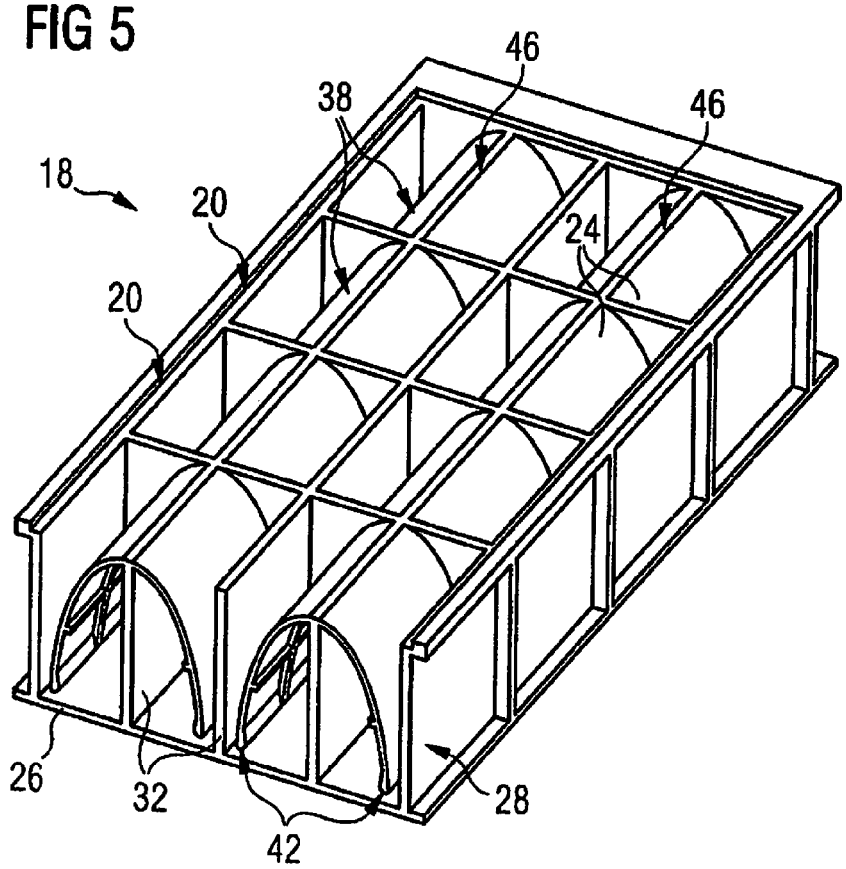
FIG. 5 shows a cross-sectional view of another embodiment of the sound absorber assembly.

The attachment portion 46 can protrude into the opening 30 to different extents; that means that the surface of the attachment portion 46 in the plane of the opening 30 can be configured differently, as this is shown in FIGS. 3a to 3j. Furthermore, the sound absorber assemblies 18 shown in FIGS. 4 and 5 differ with regard to the size of the attachment portion 46. As is shown in FIGS. 4 and 5, the attachment portion 26 can be used for attaching several tongues 24. In particular, the tongues 24 of two adjacent base bodies are disposed on a single attachment portion 46.

The sound absorber assemblies 18 shown in FIGS. 4 to 7 have base bodies 20 whose walls 28 contact each other. The side walls 32 of the walls 28 contacting each other are provided by a side wall 32, so that it is not two side walls 32 that are disposed so as to contact each other, whereby weight can be saved. This constitutes an example of a common wall 29. The walls 28 of the sound absorber assembly 18 thus form a honeycomb structure.

Figure 6:
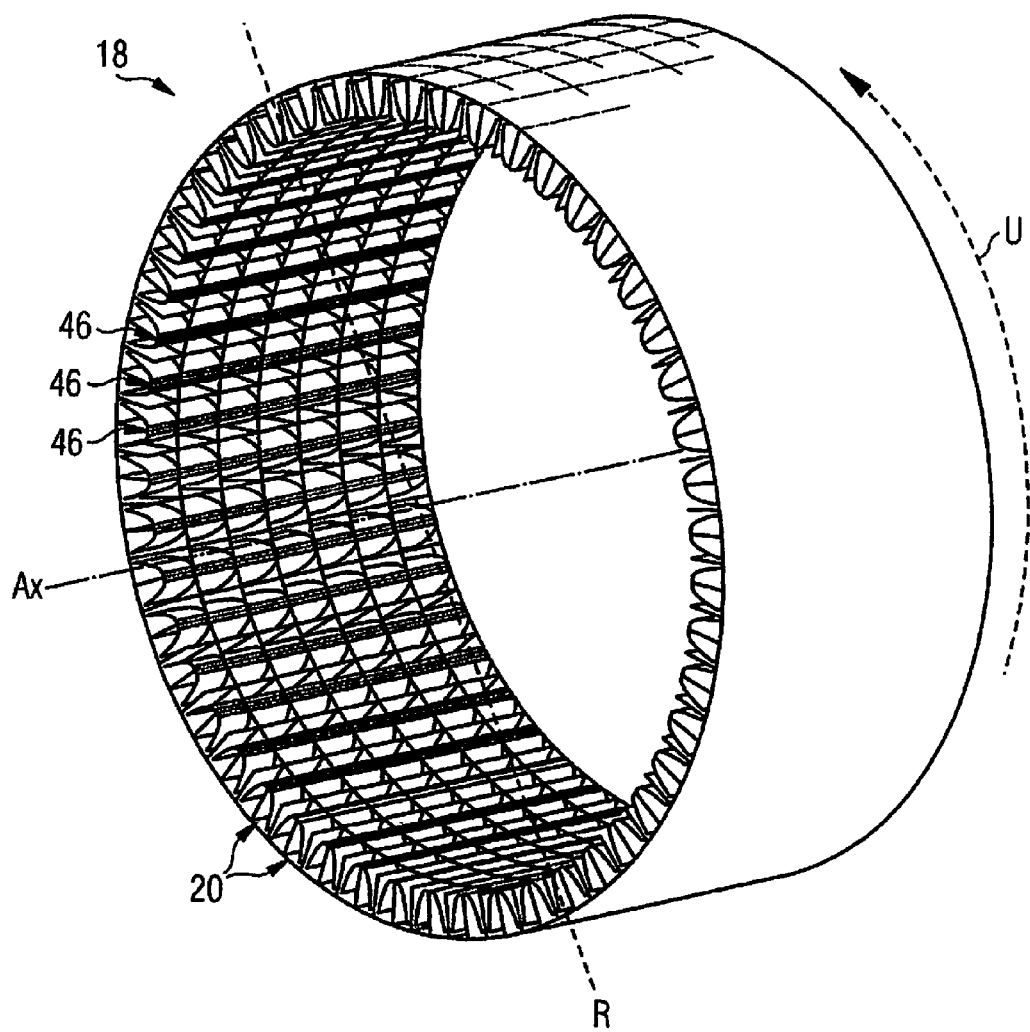
FIG. 6 shows a perspective view of a sound absorber assembly according to another embodiment.
Figure 7:
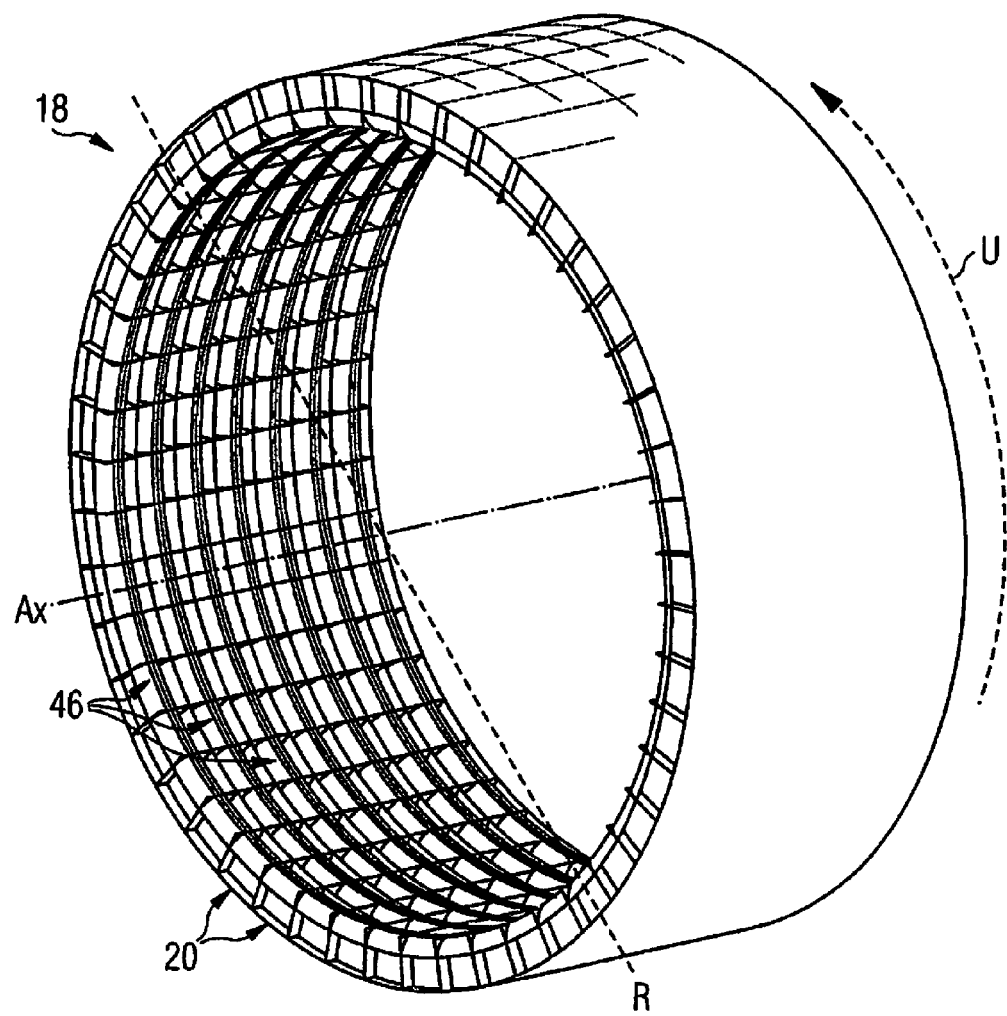
FIG. 7 shows a side view of another embodiment of the sound absorber assembly.

The sound absorber assembly 18 can extend in a plane, as shown in FIGS. 4 and 5, or have the shape of a ring, as shown in FIGS. 6 and 7. In the sound absorber assembly 18 shown in FIGS. 4 and 5, which extends in a plane, the walls 28 are disposed perpendicular to the bottom plate 26. In this case, the bottom plate 26 can be a single-piece member for the individual sound absorbers 20. A perpendicular arrangement of the wall 28 relative to the bottom plate 26 is advantageous in that the openings 30 cover the surface of the sound absorber assembly 18 without any interruptions. This makes possible a particularly high degree of efficiency of the sound absorber assembly 18 because a particularly large amount of sound is able to enter the sound absorber 20 through the openings 30.

In the case of a ring-shaped arrangement of the sound absorber assembly 18 as it is used, for example, in the engine 16, the wall 28 is disposed at an angle of less than 90° relative to the bottom plate 26, so that the base body 22 is conical. In this case, the side walls 32 extending in a circumferential direction U are disposed perpendicular to the bottom plate 26, whereas the side walls 32 disposed perpendicular to an axial direction Ax are inclined at an angle of less than 90° relative to the bottom plate 26.

The openings 30 of the individual sound absorbers 20 of the sound absorber assembly 18 are disposed inwards in the radial direction R in the embodiments shown in FIGS. 6 and 7. The attachment portion 46 is disposed in the axial direction Ax in FIG. 6, whereas the attachment portion 46 in FIG. 7 is disposed in the circumferential direction U. Tongues 24 that are inserted into the space 48 of the base body 22 are attached to each of the two sides of the attachment portion 46.

Figure 8:
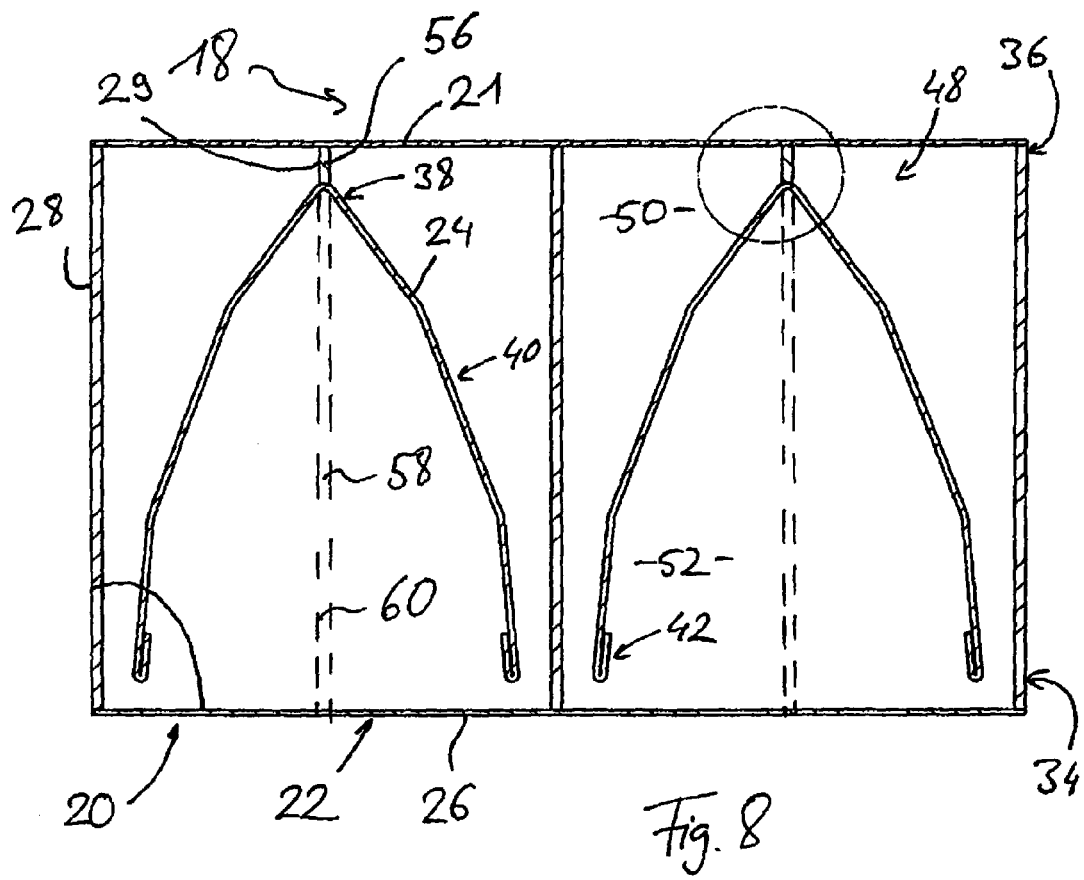
FIG. 8 shows a cross-sectional view of another embodiment of the sound absorber assembly.

The embodiment of the sound absorber assembly 18 shown in FIG. 8 matches the sound absorber assembly 18 shown in FIG. 5 with the exception of the following features.

Figure 9:
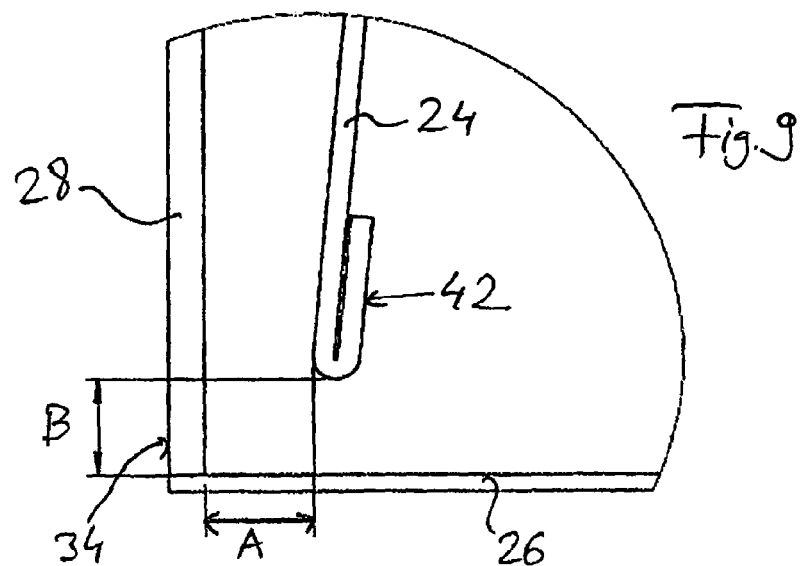
FIG. 9 shows a first enlarged view of FIG. 8.
Figure 10:
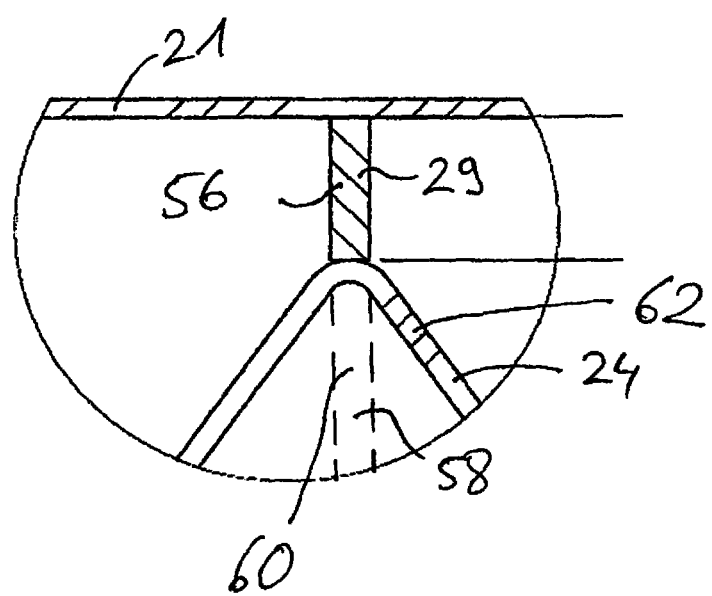
FIG. 10 shows a second enlarged view of FIG. 8.

The tongues 24 of two adjacent sound absorbers 20 are disposed symmetrically to the common wall 29. As is shown, in particular, in FIG. 9, the tongues 24 are bent over at their free ends 42. The common wall 29 replaces two contacting walls 28 of adjacent sound absorbers 20. The area at which the tongues 24 are connected to the common wall 29 divides the common wall 29 into a first upper portion 56 and a second lower portion 58. In the second portion 58, a cut-out 60 is provided whose extent matches the extent of the second cut-out 58, so that the common wall 29 is provided only in the region of the first portion 56. In FIGS. 8 and 10, this is illustrated by the depiction of the second portion 58 with dashed lines. The second partial spaces 52 of two adjacent sound absorbers 20 are thus connected to each other via the cut-out 60. They thus form a common second partial space 52. In this embodiment, the tongues 24 are configured in such a way that they are connected with each other and form a single-piece workpiece. The tongues 24 are attached to the first portion 56, which in this embodiment is realized by a web. This is shown in an enlargement in FIG. 10. A hole 62 through which the first partial space 50 can communicate with the second partial space 52 is provided on one of the tongues 24 of the two sound absorbers 20. The hole 62 serves for draining condensated water.

The structure of the sound absorber assembly 18 in the embodiment shown in FIG. 8 is depicted in FIG. 11. First common walls 29 extending in the width direction Br have first cuts 64. Second common walls 29 have second cuts 66 that are complementary to the first cuts 64. The second common walls 29 extend in a transverse direction Q. The second common walls 29 further have third cuts 72 that have the shape of the cross section of the tongues 24. The tongues 24 are connected to each other at the fixed end 38 and are pushed into the third cuts 72.

Furthermore, the second common walls 29 have fourth cuts 72 that correspond in a complementary manner to fifth cuts 74 of the first portions 56 of the third common wall 29, which are formed as a web. Assembled in such a way, the first, second and third common walls 29 are set on the bottom plate 26 and covered by the covering layer 21. Then, the plugged-together parts are welded to each other.

What is claimed is:

1. A sound absorber for an engine of an aircraft, the sound absorber comprising:
    a base body having a bottom plate, a wall enclosing the bottom plate and an opening enabling entry of air into the base body; and
    a tongue having a fixed end connected to the wall, a free end and a central portion disposed between the fixed end and the free end;
    the tongue further having a longitudinal direction extending from the fixed end towards the free end, a width direction extending substantially perpendicularly to the longitudinal direction, and a transverse direction extending substantially perpendicularly to the longitudinal direction and substantially perpendicularly to the width direction,
    the central portion having a first free edge extending in the longitudinal direction from the fixed end towards the free end, and a second free edge opposite to the first free edge and extending in the longitudinal direction from the fixed end towards the free end,
    the tongue dividing a space of the base body into a partial space adjacent to the bottom plate and a partial space adjacent to the opening, the two partial spaces being connected to each other via a gap,
    the free end being disposed at a first distance from the wall in the transverse direction and at a second distance from the bottom plate in the longitudinal direction, such that the first and the second distances determine a size of the gap, and
    the central portion being configured to extend at least partially straight along the width direction.

2. The sound absorber according to claim 1, wherein the bottom plate is trapezoidal.

3. The sound absorber according to claim 1, wherein the tongue has at least one of the following characteristics
    the tongue is bent along the longitudinal direction in a shape of one of a parabola branch, an exponential function or a hyperbola;
    the free end is curved in the longitudinal direction; and
    the tongue includes at least one of metal, sheet metal, carbon fibers and ceramic composite materials.

4. The sound absorber according to claim 1, wherein at least the central portion has two lateral portions extending in the longitudinal direction, with the lateral portions being connected with the wall.

5. The sound absorber according to claim 1, further comprising
    a covering layer covering the opening, the covering layer including at least one of a perforated metal, a μ-perforated metal and a fabric.

6. A sound absorber assembly for an engine of an aircraft, the sound absorber assembly comprising at least two sound absorbers according to claim 1.

7. The sound absorber assembly according to claim 6, wherein
    the at least two sound absorbers are disposed one behind the other in at least one of the transverse direction and the width direction; and
    the wall preferably includes at least in some regions an angle unequal to 90° with the bottom plate.

8. The sound absorber assembly according to claim 6, wherein
    the tongue is connected to the wall by an attachment portion, with the opening defining a plane and the attachment portion extending in the plane of the opening over a surface area measuring less than 10% of an extent of the opening.

9. The sound absorber assembly according to claim 8, wherein
    at least two of the tongues, which protrude into at least two of the base bodies, are disposed on one attachment portion.

10. The sound absorber assembly according to claim 6, wherein
    regions of the walls of two of the sound absorbers that abut against each other are formed by a common wall.

11. The sound absorber assembly according to claim 10, wherein
    the tongues of the two sound absorbers are attached to the common wall, with the common wall having a cut-out.

12. The sound absorber assembly according to claim 11, wherein
    an area at which at least one of the tongues is attached to the common wall divides the common wall into a first portion adjacent to the opening and a second portion adjacent to the bottom plate, with the second portion having the cut-out which includes the entire second portion.

13. The sound absorber assembly according to claim 8, wherein
    the sound absorbers are disposed in the form of a pipe having a radial direction, a circumferential direction and an axial direction, with the openings of the sound absorbers pointing inwards in the radial direction, and the attachment portions of the sound absorbers being disposed in the circumferential direction or in the axial direction.

14. The sound absorber according to claim 13, further comprising
    a drain opening disposed between the base bodies along at least one of the attachment portion of the tongue and along the bottom plate.

15. An aircraft engine comprising:
    a sound absorber according to claim 1.

16. The sound absorber according to claim 1, wherein the bottom plate is rectangular.

17. The sound absorber assembly according to claim 6, wherein
    the tongue is connected to the wall by an attachment portion, with the opening defining a plane and the attachment portion extending in the plane of the opening over a surface area measuring less than 5% of the extent of the opening.

18. The sound absorber according to claim 14, wherein
    the drain opening is disposed between the base bodies along at least one of the attachment portion of the tongue and along the bottom plate in the circumferential direction.

19. An aircraft engine comprising:
    a sound absorber assembly according to claim 6.

20. The sound absorber according to claim 2, wherein the tongue has at least one of the following charactristics
    the tongue is bent along the longitudinal direction in a shape of one of a parabola branch, an exponential function or a hyperbola;
    the free end is curved in the longitudinal direction; and
    the tongue includes at least one of metal, sheet metal, carbon fibers and ceramic composite materials.

* * * * *